United States Patent
Kurashima (10) Patent No.: US 9,829,662 B2
(45) Date of Patent: Nov. 28, 2017

(54) OPTICAL TRANSCEIVER HAVING PULL-TAB

(71) Applicant: Sumitomo Electric Industries, Ltd., Osaka-shi (JP)

(72) Inventor: Hiromi Kurashima, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 15/415,387

(22) Filed: Jan. 25, 2017

(65) Prior Publication Data

US 2017/0212315 A1   Jul. 27, 2017

(30) Foreign Application Priority Data

Jan. 27, 2016   (JP) ................. 2016-013525

(51) Int. Cl.
| | | |
|---|---|---|
| G02B 6/36 | (2006.01) | |
| H04B 10/00 | (2013.01) | |
| G02B 6/42 | (2006.01) | |
| G02B 6/38 | (2006.01) | |
| H01R 13/633 | (2006.01) | |

(52) U.S. Cl.
CPC ......... *G02B 6/4284* (2013.01); *G02B 6/3887* (2013.01); *H01R 13/6335* (2013.01)

(58) Field of Classification Search
CPC .............. H01R 13/633; H01R 13/6335; H01R 13/6271–13/6273; H01R 13/6275; G02B 6/4284; G02B 6/3887

USPC .............. 385/88, 89, 92; 439/352, 357, 358; 398/135, 139, 200, 201, 214
See application file for complete search history.

(56) References Cited

U.S. PATENT DOCUMENTS

| | | | | |
|---|---|---|---|---|
| 6,736,667 B1 * | 5/2004 | Wu | ................... | H01R 13/6335 439/362 |
| 6,866,533 B2 * | 3/2005 | Wu | ................... | H01R 13/6335 439/352 |
| 8,292,518 B2 | 10/2012 | Togami et al. | | |
| 8,475,197 B2 * | 7/2013 | Zerebilov | .......... | H01R 13/6275 439/352 |
| 9,001,515 B2 | 4/2015 | Tang et al. | | |
| 9,250,402 B2 | 2/2016 | Ishii et al. | | |
| 2006/0189197 A1 * | 8/2006 | Reed | ................... | H01R 13/6275 439/352 |
| 2014/0219616 A1 * | 8/2014 | Ishii | ..................... | G02B 6/4261 385/92 |
| 2015/0244109 A1 * | 8/2015 | Byczkiewicz | ..... | H01R 13/6335 439/352 |
| 2016/0004022 A1 | 1/2016 | Ishii et al. | | |

* cited by examiner

*Primary Examiner* — Robert Tavlykaev
(74) *Attorney, Agent, or Firm* — Venable LLP; Michael A. Sartori; Laura G. Remus (57) ABSTRACT

A pluggable optical transceiver implementing a pull-tab is disclosed. The pull-tab includes arms assembled with a body of the optical transceiver and a holder connecting the arms. The holder, which is provided in ends of the arms, provides a tab and a bridge, where the tab and the bridge form a space where an optical fiber mated with the optical transceiver is secured. The tab is dynamically engaged with the bridge after the optical fiber is set on the bridge.

8 Claims, 9 Drawing Sheets

OPTICAL TRANSCEIVER HAVING PULL-TAB

BACKGROUND OF INVENTION

1. Filed of the Invention

The present invention relates to an optical transceiver, in particular, relates to a pluggable optical transceiver having a pull-tab structure for extracting the optical transceiver from a cage installed in a host system.

2. Background Arts

Various prior documents have disclosed an optical transceiver implementing with a pull-tab for supporting an extraction of the optical transceiver from a cage prepared in the host system. The pull-tab may co-operate with sliders provided in respective sides of the optical transceiver. Pulling the pull-tab forward, the slides also slide forward and push latches in the cage outwardly, which may release the optical transceiver from the cage.

Recent host systems arrange cages in higher density. When most of those cages receive optical fibers, many fibers are pulled out from the host system and disarranged in front of the host system, the insertion of an another optical transceiver into a cage, or the extraction of the optical transceiver set in the cage is sometimes unable to be done smoothly. The optical transceiver of the invention may provide a mechanism to arrange optical fibers in front of the host system.

SUMMARY OF INVENTION

An aspect of the present invention relates to an optical transceiver type of pluggable transceiver capable of electrically communicating with a host system as plugged with a cage prepared in the host system. The optical transceiver includes a body, a pair of sliders, and a pull-tab. The body has an optical receptacle in one end thereof, while, an electrical plug that communicates with the host system in another end opposite to the formed end. The optical receptacle receives an optical fiber. The sliders, which are provided in respective sides of the body, may release the engagement of the optical transceiver with the cage. The pull-tab has a pair of arms and a holder. The arms in one of ends thereof are assembled with the sliders and co-operating therewith. The holder connects the arms at another of ends thereof. A feature of the optical transceiver of the present invention is that the holder secures the optical fiber received in the optical receptacle in front of the optical receptacle.

BRIEF DESCRIPTION OF DRAWINGS

The foregoing and other purposes, aspects and advantages will be better understood from the following detailed description of a preferred embodiment of the invention with reference to the drawings, in which.

DESCRIPTION OF EMBODIMENT

Next, embodiment of the present invention will be described as referring to drawings. In the description of the drawings, numerals or symbols same with or similar to each other will refer to elements same with or similar to each other without duplicating explanations.

First Embodiment

Figure 1:
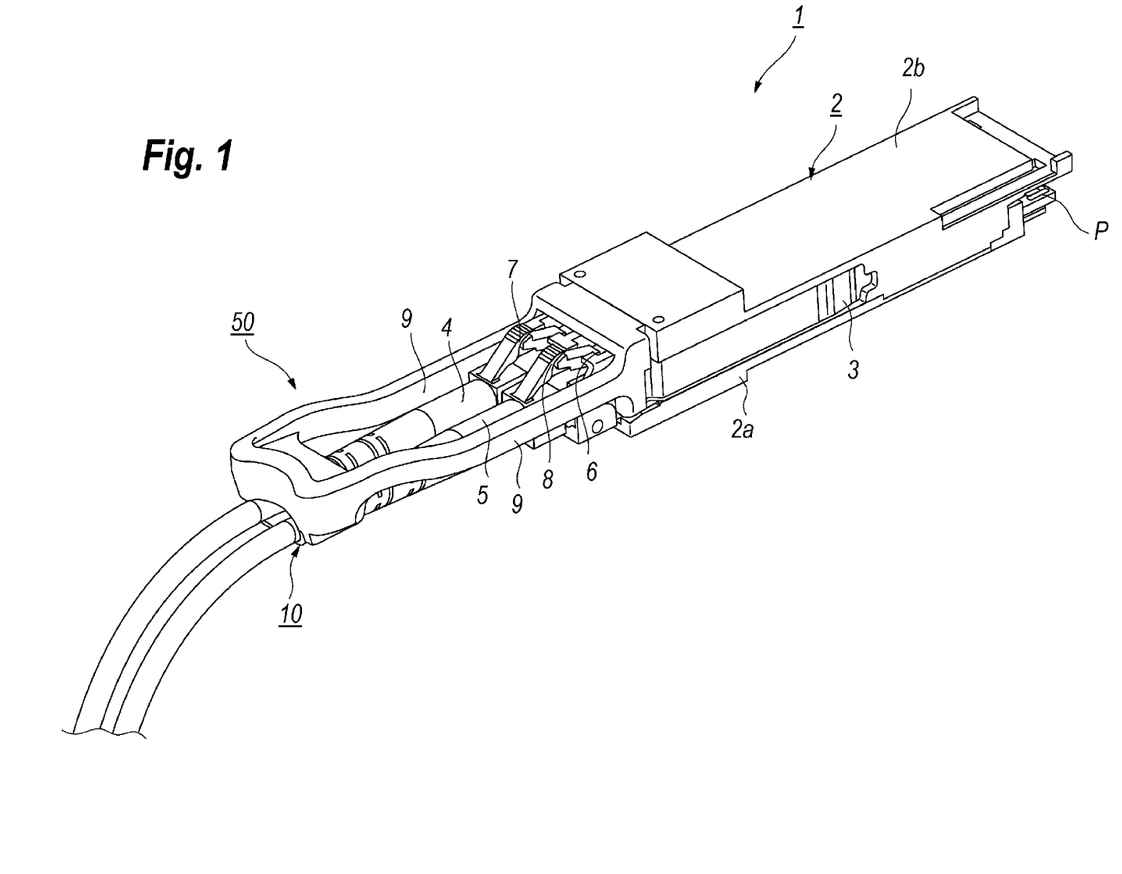
FIG. 1 is a perspective drawing of an optical transceiver of the present invention viewed from a top.
Figure 2:
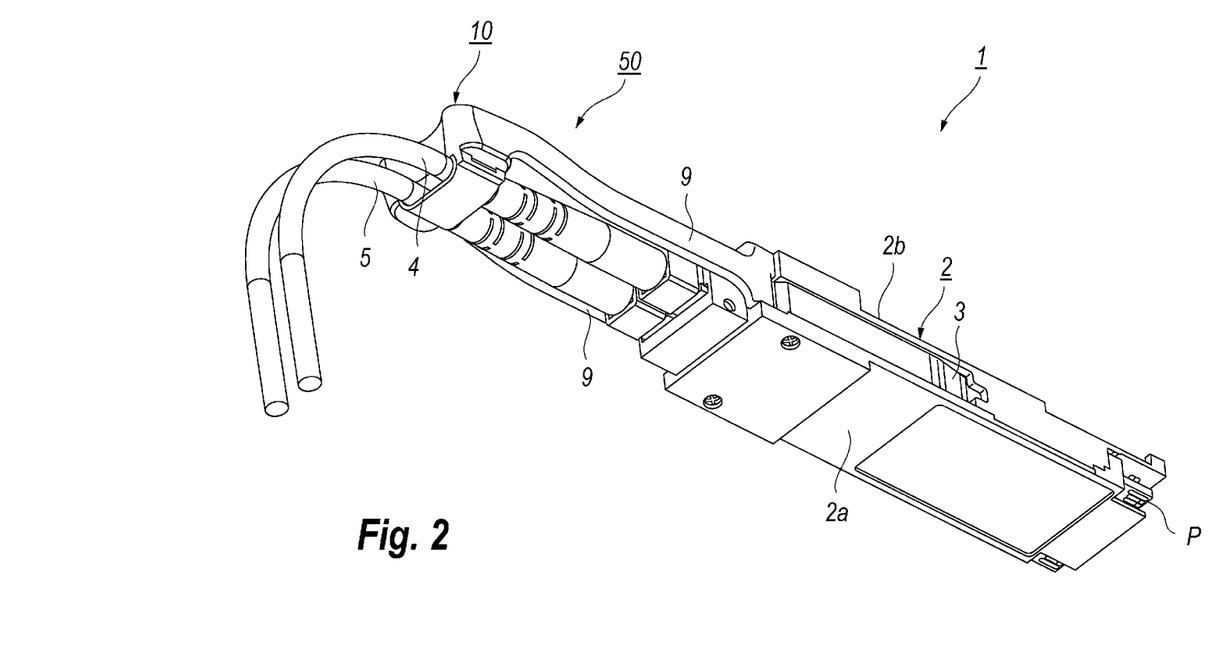
FIG. 2 is a perspective drawing of the optical transceiver viewed from a bottom thereof.

FIG. 1 shows an outer appearance of an optical transceiver 1 viewed from a top thereof, and FIG. 2 also shows the outer appearance viewed from the bottom. The optical transceiver 1 of the present embodiment is a type of, what is called, pluggable optical transceiver set within a cage that is prepared in the host system. The optical transceiver 1 has a metal body 2, a slider 3 attached to the body so as to be slidable along a longitudinal direction of the body 2, an optical receptacle 6 provided in a front end of the body 2, and a pull-tab 50 assembled with the slider 3. The pull-tab 50 includes a pair of arms 9 and a holder 10. The arms 9 extend from the front end of the body 2 so as to put the optical receptacle 6 therebetween. The holder 10 includes a bridge that connects respective front ends of the arms 9. The description below assumes a direction of 'front' and/or 'forward' to be as side where the pull-tab 50 is provided, while, a direction of 'rear' and/or 'back' is a side opposite to the above.

The body 2, which has a box shape with the longitudinal axis along which the optical transceiver 1 may be set within the cage of the host system, installs optical sub-assemblies and electronic circuits therein. The body 2 comprises a bottom housing 2a, with which the slider 3 is assembled, and a top housing 2b. The slider 3 may engage the optical transceiver 1 with the cage of the host system and may operate to release the optical transceiver 1 from the cage.

The top housing 2b provides an optical receptacle 6 in a front end of the optical transceiver, where the optical receptacle 6 receives external optical connectors, 7 and 8, secured in tip ends of external fibers, 4 and 5. Also, the optical transceiver 1 provides an electrical plug P in the rear end thereof. The plug p may engage with an electrical connector provide in a deep end of the cage. Engaging the electrical plug P with the connector as the optical transceiver 1 is set within the cage, the optical transceiver 1 may communicate with the host system through the electrical plug P. The optical fiber 4 is for transmitting an optical signal from the optical transceiver 1, while, the other fiber 5 is for receiving another optical signal from an external. Mating the optical connectors, 7 and 8, with the optical receptacle 6, the optical transceiver 1 may optically perform, what is called, the full-duplex optical communication to another optical transceiver. The optical connectors, 7 and 8, and the optical receptacle 6 of the present embodiment follow the standard of the LC-connector.

The pull-tab 50, which may be made of resin, show elastic function. The arms 9, which extend from the front sides of the body 2 forward, may be connected with the slider 3. Pulling the arms 9 forward, the slider 3 also moves forward, which disengage the optical transceiver 1 from the cage. The optical fibers, 4 and 5, may be supported by the holder 10 provided in the front end of the arms 9. Specifically, the optical fibers, 4 and 5, which are extracted from the optical receptacle 6, are held by the holder 10 and hung down thereby. That is, the optical fiber, 4 and 5, are bent downward by the holder 10 as an initial point. The holder 10 may be also made of resin.

Figure 3:
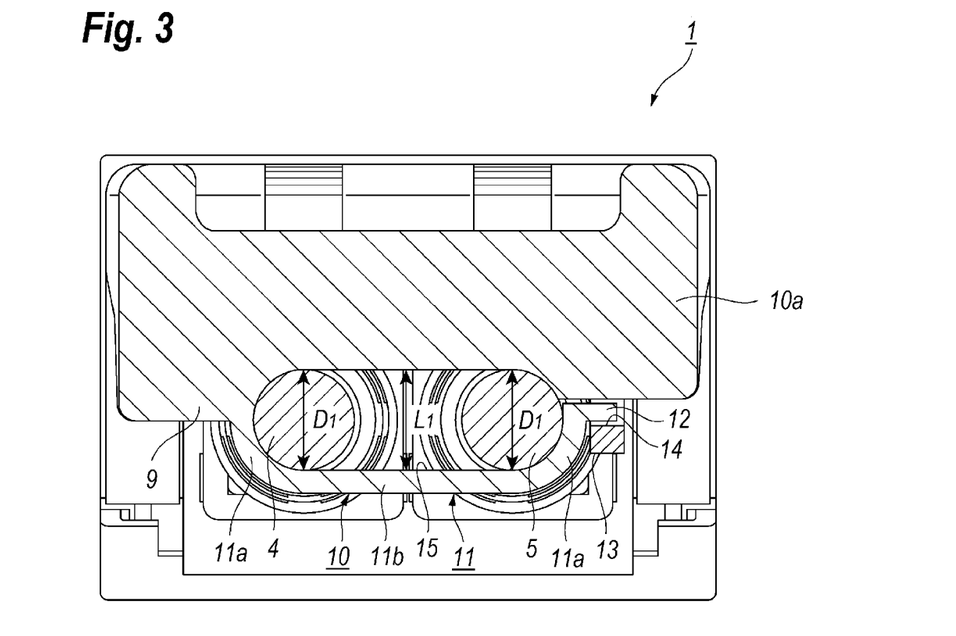
FIG. 3 shows a cross section of a holder that secures optical fibers.
Figure 4:
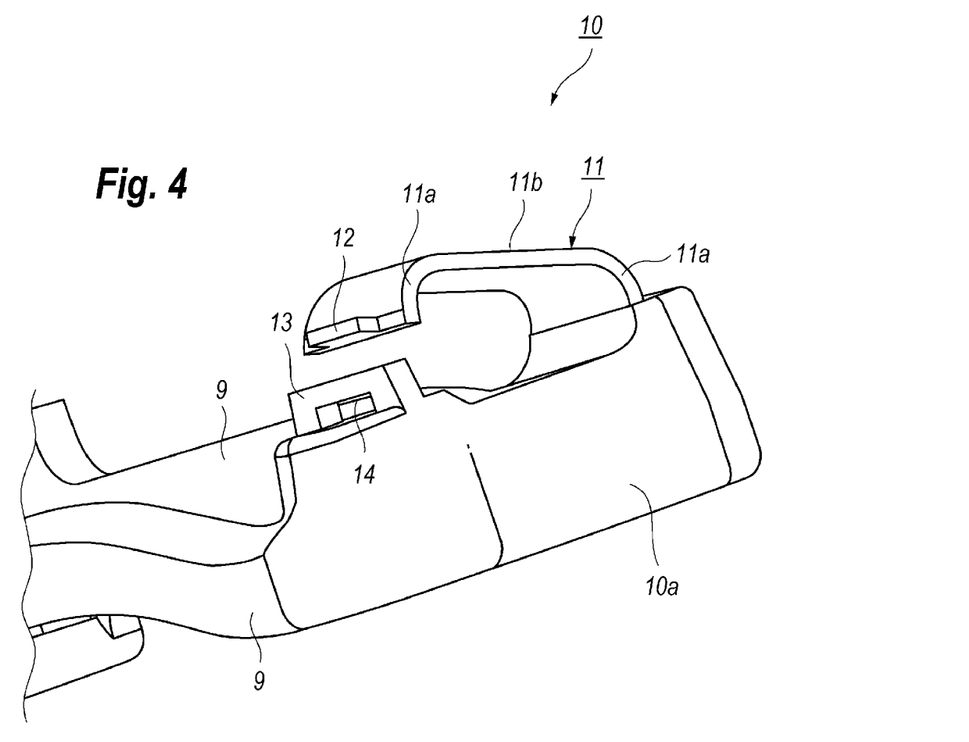
FIG. 4 is a perspective drawing of the holder shown in FIG. 3.

FIG. 3 shows a cross section of the holder 10, and FIG. 4 is a perspective vie thereof. The holder 10 includes a tab 11, the bridge 10a, and a hook 13, where these members form a space through which the optical fibers pass. The bridge 10a connects the respective ends of the arms 9. The tab 11 provides a projection in 12 an end thereof, while, the hook 13 provides an opening 14 into which the projection 12 of the tab 11 is to be engaged.

The tab 11, which shows a U-shaped cross section, is extracted from one of the arms 9 as being bent inward. That is, the tab 11 includes two bent portions 11a in respective sides thereof and a linear portion 11b between the bent portions 11a. One of the bent portion 11a continues to the bridge 10a, while, the other of the bent portion 11a extrudes the projection 12 from an outer side thereof.

Figure 5A:
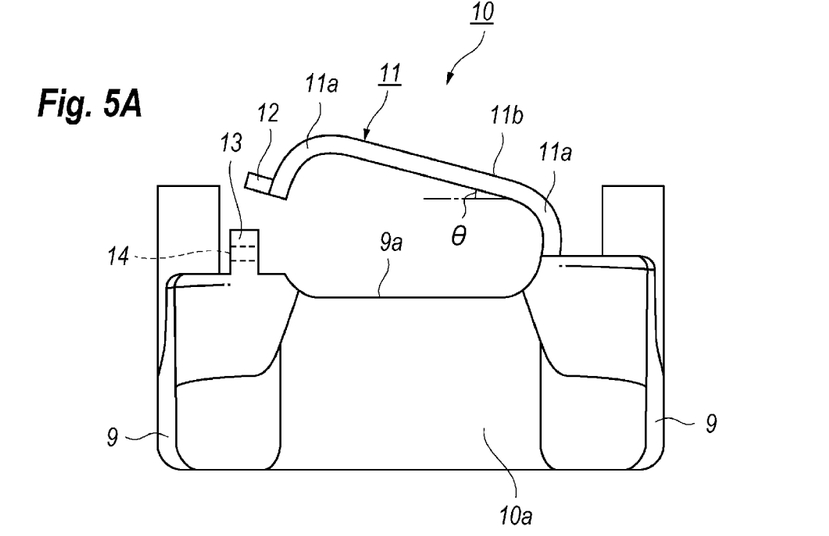
FIG. 5A is a front view of the holder when a projection provided in an end of a tab is free from a hook provided in the arm.
Figure 5B:
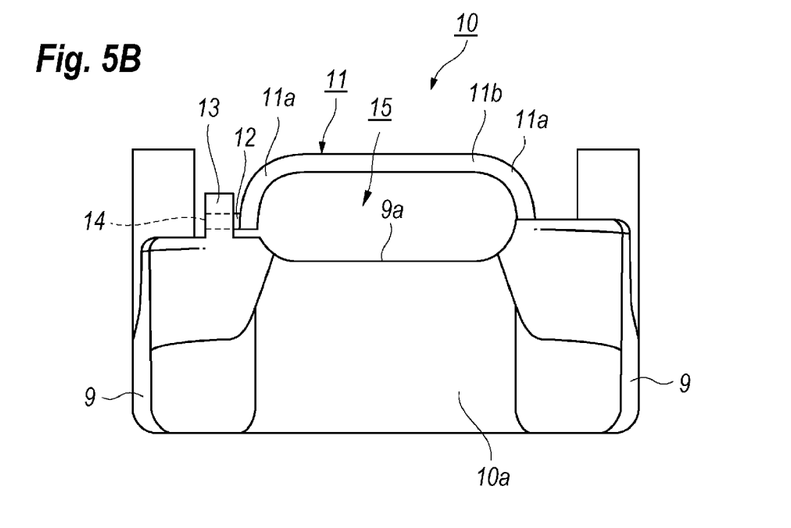
FIG. 5B is also a front view of the holder when the projection is engaged with the hook.

FIG. 5A is a cross section of the holder 10 when the projection 12 is free from the opening 14, and FIG. 5B is a status when the projection 12 is engaged with the opening 13. The tab 11, when the hook 12 is disengaged, in the linear portion 11b thereof makes an angle of, for instance, 20 to 40° with respect to the level. Engaging the projection 12 with the hook 13 by bending the bent portion 11a, which extends from the arm 9, the tab 11, the bent portions 11a, and the bridge 10a in the hollow 9a thereof may form an extended circular space 15 as FIG. 5B shows. Setting dimensions L1 and D1 to be a distance between the tab 11 and the hollow 9a of the bridge 10a and a diameter of the optical fibers, 4 and 5, respectively, the former L1 is slightly smaller than the latter D1 when the projection 12 engages with the hook 13 but the optical fibers, 4 and 5, do not pass the space. Passing the optical fibers, 4 and 5, through the space 15 and engaging the projection 12 with the hook 13, the optical fibers, 4 and 5, are tightly fastened within the space 15. Thus, the holder 10 may securely fasten the optical fibers, 4 and 5, extracted from the optical receptacle 6.

Figure 6:
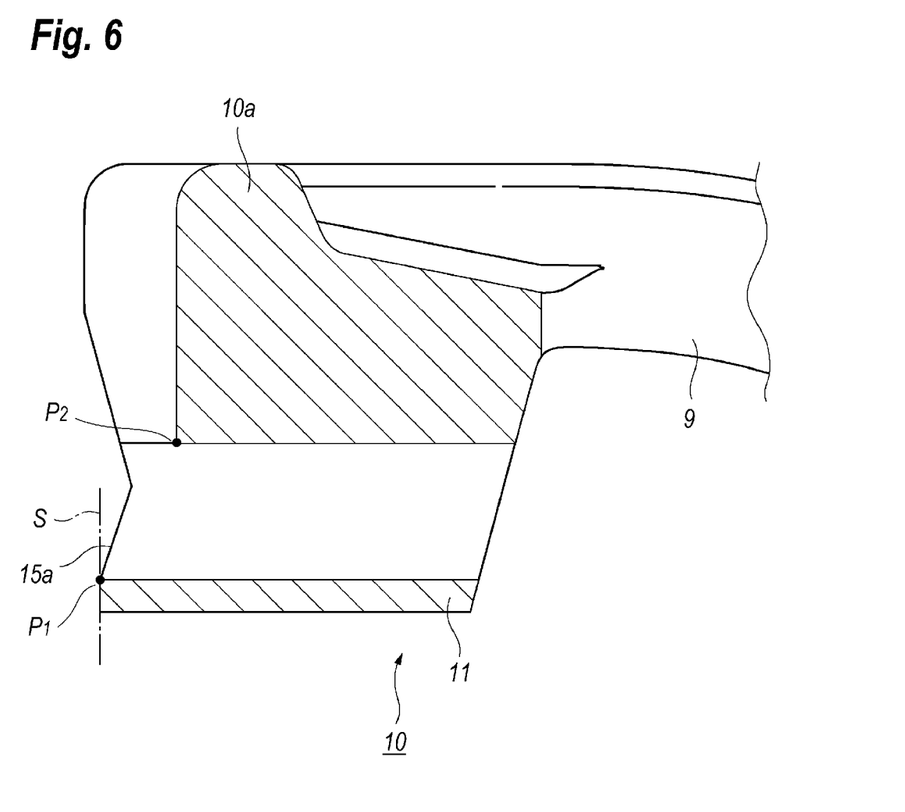
FIG. 6 is a side cross section of the holder.

FIG. 6 shows a cross section of the space 15 taken along the longitudinal direction thereof. As shown in FIG. 6, the tab 11 partly overlaps with the bride 10a; exactly, the tab 11 protrudes rearward from the edge of the bridge 10a. Also, the bent portion 11a of the tab 11 extending from the bridge 10a in the rear end 15a thereof makes a substantial angle against the vertical direction S.

Next, advantages of the holder 10 will be described. The pull-tab of the present embodiment provides the pair of arms 9 and the holder 10 in the respective ends of the arms 9. The holder 10 includes the bridge 10a connecting the arms 9, the tab 11, and the bent portions 11a, where these members, 10a, 11, and 11a, may form the space 15 for fastening the optical fibers, 4 and 5, extracted from the optical receptacle 6 of the optical transceiver 1. Inserting the optical transceiver 1 into the cage and mating the optical connectors, 7 and 8, with the optical receptacle 6; the optical fibers, 4 and 5, may be securely held by the holder 10. The optical fibers, 4 and 5, engaged with the optical receptacle 6 may be tidied up in front of the cage.

The holder 10 includes the tab 11 and the projection 12 in the end of the tab 11. The tab 11 and the hollow 9a may form the extended circular space 15, which may be formed after the optical fibers, 4 and 5, are set on the hollow 9a by bending the bent portion 11a and engaging the hook 13 with the projection 12. Because the distance L1 between the tab 11 and the hollow 9a, when the space 15 is free from the optical fibers, 4 and 5, is slightly smaller than the diameter D1 of the optical fibers, 4 and 5, the engagement between the hook 13 and the projection 12 may tightly fasten the optical fibers, 4 and 5, set on the hollow 9a and passing through the space 15.

Figure 7:
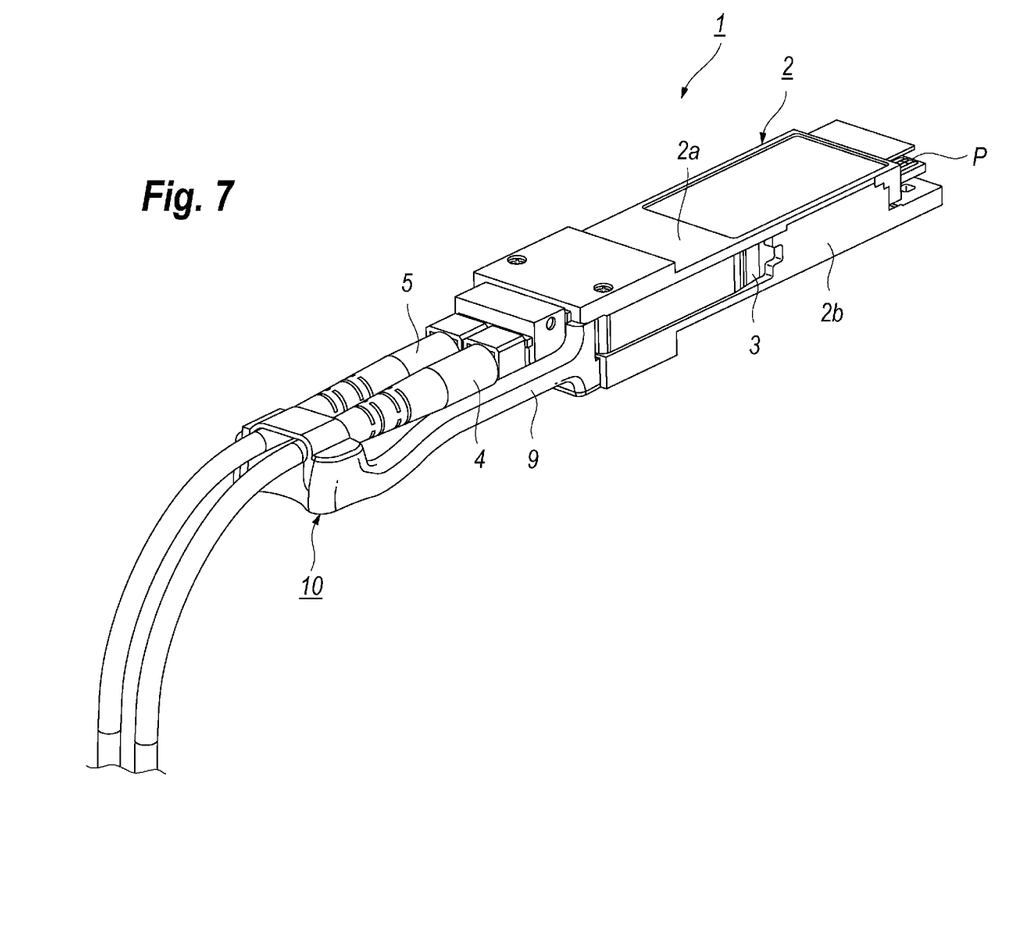
FIG. 7 is a perspective view of the optical transceiver plugged within the cage in upside down attitude.

Recent host systems often provide two cages arranged in both of a top surface and a back surface of a circuit board to enhance the form factor. In such a case, an optical transceiver may be inserted into the cage prepared in the top surface of the board in an ordinary attitude shown in FIG. 1. However, another optical transceiver, as illustrate in FIG. 7, is to be inserted upside down into a cage provided in the back surface of the substrate. Even in such an attitude of the optical transceiver, the optical fibers, 4 and 5, may dangle from the holder 10. Moreover, the holder 10 of the present invention may distinguish the point from which the optical fibers, 4 and 5, begin to dangle.

Figure 8A:
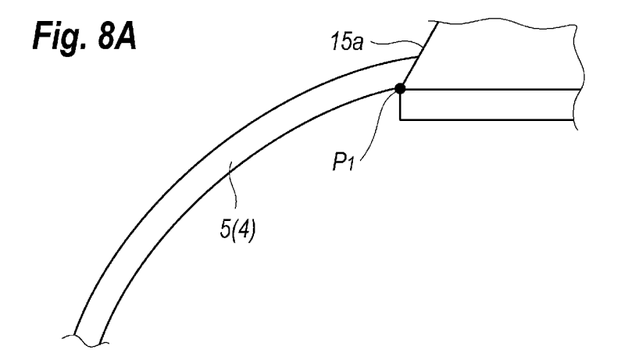
FIG. 8A schematically illustrates the optical fiber secured in the holder when the optical transceiver is inserted in a normal attitude.
Figure 8B:
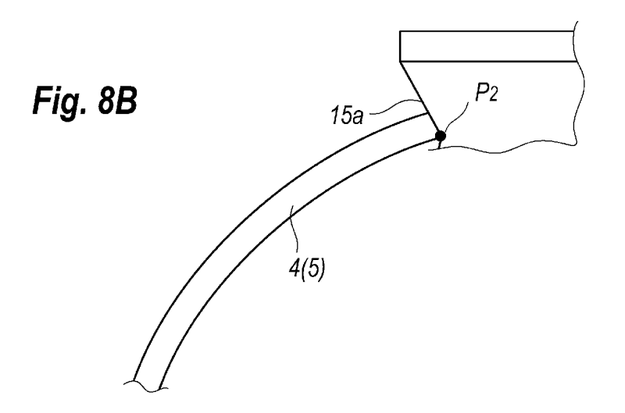
FIG. 8B illustrates the optical fiber when the optical transceiver is inserted into the cage in upside down attitude.

Specifically, as FIGS. 6, 8A and 8B illustrate, the point $P_1$ from which the optical fiber begins to bend downward in the normal attitude of the optical transceiver, shown in FIG. 8A, becomes far from the optical receptacle 6 compared with the point $P_2$ from which the optical fiber dangles at the upside down attitude, shown in FIG. 8B. Accordingly, even when two optical transceivers engage within the cages vertically arranged, the optical fibers, 4 and 5, pulled out from the respective optical transceivers may not be interfered to each other.

Second Embodiment

Figure 9A:
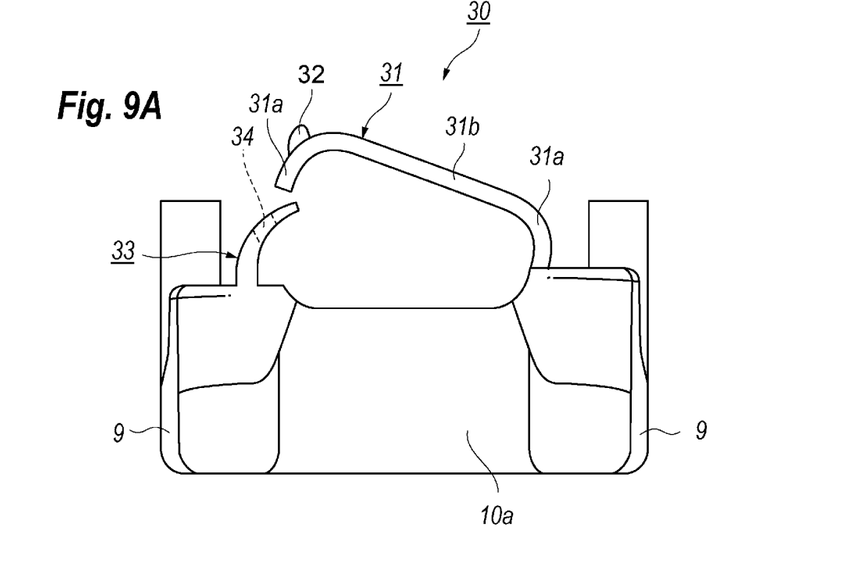
FIG. 9A is a front view of a holder of the second embodiment when the projection thereof is free from the hook.
Figure 9B:
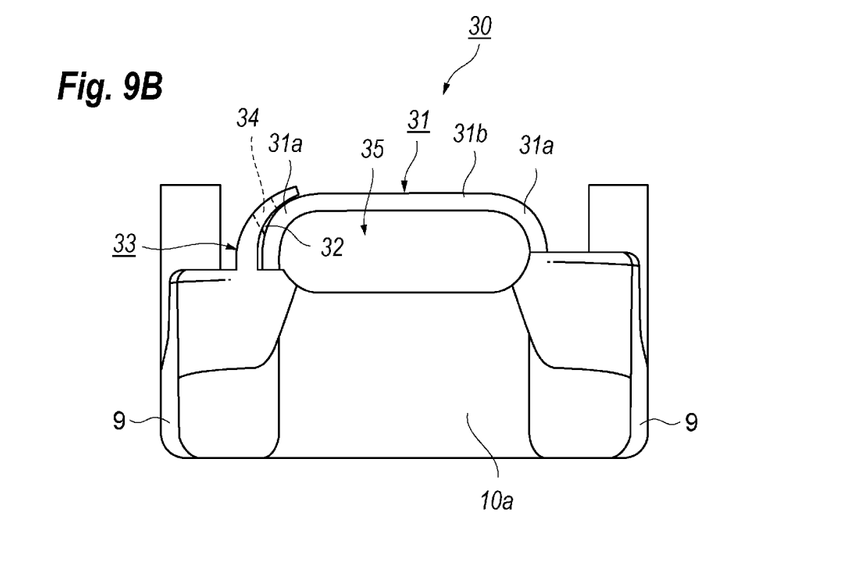
FIG. 9B is also a front view thereof when the projection is engaged with the hook.

FIG. 9A is a front view of the holder 30 of the second embodiment when the hook 32 is free from the opening 34, and FIG. 9B shows a status when the hook 32 is engaged with the opening 34.

The holder 30 includes the tab 31 having two bent portions 31a and a linear portion 31b connecting the bent portions 31a similar to that of the first embodiment. One of the bent portions 31b provides in an outer side thereof the hook 32. The opening 34 to be engaged with the projection 32 is provided in the hook 33 extending from the arm 9. The hook 33 has a shape following the outer surface of the one of the bent portions 31a having the projection 32. The hook 33 may overlap with the one of the bent portion 31a when the projection 32 is engaged with the hook 33, and the linear portion 31b, the bent portions 31a, and the hollow 9a of the bridge 10a may form the extended circular space 35 into which the optical fibers, 4 and 5, are to be set. Because the bent portion 31a having the projection 32 and the hook 33 overlap to each other, the holder 30 may fasten the optical fibers, 4 and 5, further securely.

In the foregoing detailed description, the present invention has been described with reference to specific exemplary embodiment thereof. It will, however, be apparent that various modifications and changes may be made thereto without departing from the broader spirit and scope of the present invention. For instance, although the embodiment integrally provides the holder 10, including the tabs, 11 and 31, with the arms 9, the holder 10 may be formed independent of the arms 9 and assembled with the arms 9. Accordingly, the present specification and figures are to be regarded as illustrative rather than restrictive.

The present application claims the benefit of priority of Japanese Patent Application No. 2016-013525, filed on Jan. 27, 2016, which is incorporated herein by reference.

I claim:

1. An optical transceiver capable of electrically communicating with a host system as engaged within a cage prepared in the host system, comprising:
   a body having an optical receptacle in an end thereof and an electrical plug that communicates with the host system in another end opposite to the end, the optical receptacle receiving an optical fiber;
   a pair of sliders provided in respective sides of the body, the slider releasing the engagement of the optical transceiver with the cage; and
   a pull-tab having a pair of arms and a holder, the arms in one of ends thereof being assembled with the sliders and co-operating therewith, the holder providing a bridge and a tab that includes two bent portions and a linear portion, the bridge connecting the arms at another of ends thereof, one of the bent portions extending from one of the arms, the linear portion connecting the two bent portions, the other one of the bent portions providing a projection, the other one of the arms providing a hook with an opening in an end thereof, the projection being engaged with the opening of the hook,
   wherein the linear portion of the tab makes a distance against the bridge that is shorter than a diameter of the optical fiber when the projection provided in the other one of the bent portions engages with the opening in the end of the other one of the arms and no fiber is held in the holder, thereby the holder securely holds the optical fiber received in the optical receptacle in front of the optical receptacle.

2. The optical transceiver of claim 1,
   wherein the bridge includes a hollow, and
   wherein the linear portion, the bent portions, and the hollow form a circular space extending towards the bent portions, the circular space securing the optical fiber therein.

3. The optical transceiver of claim 1,
   wherein the hook traces an outer shape of the other one of the bent portions of the tab.

4. The optical transceiver of claim 1,
   wherein the tab has an edge in an outer side apart from the optical receptacle and the bridge has another edge in the side apart from the optical receptacle, the edge of the tab being offset from the another edge of the bridge along a direction the optical fiber extends.

5. The optical transceiver of claim 4,
   wherein the edge of the tab is far from the optical receptacle compared with the another edge.

6. The optical transceiver of claim 1,
   wherein the pull-tab is made of resin.

7. The optical transceiver of claim 1,
   wherein the optical transceiver includes a transmitting fiber that carries an optical signal outgoing from the optical transceiver and a receiving fiber that carries another optical signal incoming to the optical transceiver.

8. The optical transceiver of claim 1,
   wherein the arms extend from respective sides of the body.

* * * * *